US007320832B2

(12) United States Patent
Palumbo et al.

(10) Patent No.: US 7,320,832 B2
(45) Date of Patent: Jan. 22, 2008

(54) FINE-GRAINED METALLIC COATINGS HAVING THE COEFFICIENT OF THERMAL EXPANSION MATCHED TO THE ONE OF THE SUBSTRATE

(75) Inventors: Gino Palumbo, Toronto (CA); Jonathan McCrea, Toronto (CA); Klaus Tomantschger, Mississauga (CA); Iain Brooks, Toronto (CA); Daehyun Jeong, Oakville (CA); Dave Limoges, Etobicoke (CA); Konstantinos Panagiotopoulos, Toronto (CA); Uwe Erb, Toronto (CA)

(73) Assignee: Integran Technologies Inc., Toronto, Ontario (CA)

( * ) Notice: Subject to any disclaimer, the term of this patent is extended or adjusted under 35 U.S.C. 154(b) by 24 days.

(21) Appl. No.: 11/297,805

(22) Filed: Dec. 9, 2005

(65) Prior Publication Data

US 2007/0281176 A1    Dec. 6, 2007

Related U.S. Application Data

(63) Continuation-in-part of application No. 11/013,456, filed on Dec. 17, 2004.

(51) Int. Cl.
*B32B 5/16* (2006.01)
*B32B 7/02* (2006.01)
*B32B 7/04* (2006.01)
*B32B 15/04* (2006.01)
*B32B 15/16* (2006.01)

(52) U.S. Cl. ........................ 428/548; 428/553; 428/565; 428/615; 428/457

(58) Field of Classification Search .................. None
See application file for complete search history.

(56) References Cited

U.S. PATENT DOCUMENTS

| 3,655,433 A | 4/1972 | Poppe et al. ........... 117/138.8 E |
| 3,749,021 A | 7/1973 | Burgess ........................ 102/43 |
| 3,867,264 A | 2/1975 | Carson ........................... 204/4 |
| 3,974,044 A | 8/1976 | Tremmel ...................... 204/43 |
| 4,129,482 A | 12/1978 | Lash ............................. 204/43 |
| 4,188,032 A | 2/1980 | Yanagioka ................... 273/80 |
| 4,195,117 A | 3/1980 | Luch .......................... 428/626 |
| 4,556,607 A | 12/1985 | Sastri |
| 5,218,171 A | 6/1993 | Aldissi ..................... 174/128.1 |
| 5,302,414 A | 4/1994 | Alkhimov et al. .......... 427/192 |
| 5,324,032 A | 6/1994 | Minami ....................... 273/80 |
| 5,342,503 A | 8/1994 | Byler et al. ................ 205/138 |
| 5,352,266 A | 10/1994 | Erb et al. ..................... 75/300 |
| 5,433,797 A | 7/1995 | Erb et al. ................... 148/304 |
| 5,453,173 A | 9/1995 | Oyama ........................ 205/70 |
| 5,655,981 A | 8/1997 | Reed .......................... 473/560 |
| 5,713,800 A | 2/1998 | Su |
| 5,728,474 A * | 3/1998 | Niemeyer et al. .......... 428/458 |
| 5,817,267 A | 10/1998 | Covino et al. .............. 264/219 |
| 5,967,904 A | 10/1999 | Nagai et al. |
| 6,334,824 B1 | 1/2002 | Filice et al. |
| 6,372,118 B1 | 4/2002 | Hui ............................ 205/259 |
| 6,409,902 B1 | 6/2002 | Yang et al. .................... 205/70 |
| 6,468,672 B1 | 10/2002 | Donovan, III et al. ....... 428/626 |
| 6,509,107 B2 | 1/2003 | Ding et al. ................. 428/626 |
| 6,554,726 B2 | 4/2003 | Thurber ...................... 473/578 |
| 6,672,125 B2 | 1/2004 | Kenney et al. ............... 72/296 |
| 6,679,788 B1 | 1/2004 | Heinrich et al. |
| 6,915,964 B2 | 7/2005 | Tapphorn et al. ........... 239/128 |
| 2001/0051549 A1 | 12/2001 | Inoue et al. |
| 2002/0061374 A1 | 5/2002 | O'Brien et al. |
| 2002/0098906 A1 | 7/2002 | Hsu |
| 2004/0055675 A1 | 3/2004 | Kuramoto et al. |
| 2004/0092330 A1 | 5/2004 | Meyer et al. |
| 2004/0121864 A1 | 6/2004 | Morrow et al. |
| 2004/0147346 A1 | 7/2004 | Casasanta, Jr. |
| 2004/0244888 A1 | 12/2004 | Horimura et al. |

(Continued)

FOREIGN PATENT DOCUMENTS

DE    101 08 893 A1    10/2002

(Continued)

OTHER PUBLICATIONS

Jeong, D.H., et al., "The Effect of Grain Size on The Wear Properties of Electrodeposited Nanocrystalline Nickel Coatings", Scripta mater, 44 (2001), pp. 493-499.

*Primary Examiner*—Jennifer C. McNeil
*Assistant Examiner*—Jason L. Savage
(74) *Attorney, Agent, or Firm*—Bacon & Thomas, PLLC

(57) ABSTRACT

Fine-grained (average grain size 1 nm to 1,000 nm) metallic coatings optionally containing solid particulates dispersed therein are disclosed. The fine-grained metallic materials are significantly harder and stronger than conventional coatings of the same chemical composition due to Hall-Petch strengthening and have low linear coefficients of thermal expansion (CTEs). The invention provides means for matching the CTE of the fine-grained metallic coating to the one of the substrate by adjusting the composition of the alloy and/or by varying the chemistry and volume fraction of particulates embedded in the coating. The fine-grained metallic coatings are particularly suited for strong and lightweight articles, precision molds, sporting goods, automotive parts and components exposed to thermal cycling. The low CTEs and the ability to match the CTEs of the fine-grained metallic coatings with the CTEs of the substrate minimize dimensional changes during thermal cycling and prevent premature failure.

21 Claims, No Drawings

U.S. PATENT DOCUMENTS

| | | |
|---|---|---|
| 2005/0103408 A1 | 5/2005 | Kuehmann et al. |
| 2005/0124433 A1 | 6/2005 | Scruggs et al. |
| 2006/0160636 A1 | 7/2006 | Palumbo et al. |
| 2006/0193742 A1 | 8/2006 | Miura et al. |

FOREIGN PATENT DOCUMENTS

| | | |
|---|---|---|
| DE | 102 28 323 B4 | 6/2005 |
| EP | 0 341 643 A1 | 11/1989 |
| JP | 06292745 A | 10/1994 |
| JP | 9-266967 | 10/1997 |
| WO | WO 2004/001100 A1 | 12/2003 |
| WO | WO 2004/074550 A1 | 9/2004 |
| WO | WO 2004/092450 A1 | 10/2004 |
| WO | WO 2004/094699 A1 | 11/2004 |

\* cited by examiner

FINE-GRAINED METALLIC COATINGS HAVING THE COEFFICIENT OF THERMAL EXPANSION MATCHED TO THE ONE OF THE SUBSTRATE

CROSS-REFERENCE TO RELATED APPLICATIONS

This application is a continuation-in-part of U.S. application Ser. No. 11/013,456, filed Dec. 17, 2004.

FIELD OF THE INVENTION

This invention relates to fine-grained (average grain-size: 1-1,000 nm) metallic coatings optionally containing particulates to form metal matrix composites (MMCs). The fine-grained metallic materials have a low coefficient of thermal expansion, exhibit high strength, high wear resistance, high modulus of resilience and high corrosion resistance. Reducing the grain size strongly enhances selected physical properties of the coating e.g. in the case of nickel, the ultimate tensile strength increases from 400 MPa (for conventional grain-sizes greater than 5 micron) to 1,000 MPa (grain size of 100 nm) and ultimately to over 2,000 MPa (grain size 10 nm). Similarly, the hardness for nickel increases from 140 HV (for conventional grain-sizes greater than 5 micron) to 300 HV (grain size of 100 nm) and ultimately to 650 HV (grain size 10 nm). The wear rate for dry pin-on-disc decreases from 1,330 $\mu m^3$ $\mu m$ for conventional nickel to 7.9 $\mu m^3$ $\mu m$ for nickel with a grain size of 10 nm.

Suitable permanent substrates include metals and metal alloys, glass, ceramics, composites and carbon based materials selected from the group of graphite, graphite fibers and carbon nanotubes as well as polymer materials filled with or reinforced with e.g. graphite or glass to reduce the CTE. For strength and cost reasons, filled polymers are very desirable plastic substrate materials for automotive applications. The term "filled" as used herein refers to polymer resins which contain fillers embedded in the polymer, e.g. fibers made of graphite, carbon nanotubes, glass and metals; powdered mineral fillers (i.e., average particle size 0.2-20 microns) such as talc, calcium silicate, silica, calcium carbonate, alumina, titanium oxide, ferrite, and mixed silicates. A large variety of filled polymers having a filler content of up to about forty percent by weight are commercially available from a variety of sources. If required, e.g. in the case of electrically non-conductive or poorly conductive substrates and the use of electroplating for the coating deposition, the substrates can be metallized to render them sufficiently conductive for plating. The fine-grained coating layer is substantially thicker than the metallized layer. The composition of the fine-grained metallic coating is selected to match the CTE of the electrodeposited metallic material with the one of the permanent substrate as outlined in Table 1.

TABLE 1

Coefficients of Thermal Expansion Ranges for Selected Substrate Materials and Fine-Grained Coatings

| Coefficient of Thermal Expansion @ RT [$10^{-6}$ $K^{-1}$] | Fine-grained Coatings (metal/metal alloy grain-size ≦1,000 nm) | Substrate |
|---|---|---|
| −1 to 5 | NiCo-60-70Fe; W/W Alloys; fine-grained MMCs | Aerospace and Commercial Graphite Composites, Pyrex glass |
| 5-10 | Mo/Mo Alloys; Zr/Zr Alloys; V/V Alloys; Pt/Pt Alloys, NiCo-40-60Fe, NiCo-70-100Fe; fine-grained MMCs | Fiberglass Composites; Epoxy/Kevlar Composites, glass |
| 10-15 | NiCo-0-40Fe, Ni/Ni Alloys, Co/Co Alloys; Ti/Ti Alloys; Au/Au Alloys; fine-grained MMCs | Glass filled Polyimide; glass filled Epoxy; Ti/Ti alloys, Fe and Selected Steels |
| 15-20 | Cu/Cu Alloys; fine-grained MMCs | Ni/Ni Alloys; Co/Co Alloys, Cu/Cu Alloys, Mild (15) and Stainless Steels (19), Sn/Sn Alloys (20) |
| 21-25 | Al Alloys; fine-grained MMCs | Al/Al alloys (6061 T-6) (23); glass filled polycarbonate (22), glass filled Nylon (23), glass filled polyester (25), Zytel containing short glass fibers (22) |
| >25 | — | Zn/Zn Alloys, Mg/Mg alloys, Pb/Pb alloys, unfilled polymers including Epoxy, PVC, Polycarbonate, Acrylic, ABS, Nylon, Polypropylene, Polyethylene |

The fine-grained metallic coatings are deposited onto permanent substrates using several known deposition processes including electrodeposition, physical vapor deposition (PVD), chemical vapor deposition (CVD), gas condensation, cold spraying and the like. These processes economically and conveniently enable the deposition of the coating and to achieve the desired coating properties and CTEs.

Suitable articles include, but are not limited to, precision graphite fiber/epoxy molds used in aerospace, automotive and other industrial applications that are exposed to repeated temperature cycling (between 200 K and up to 623 K). Laminate parts made from the fine-grained metallic coatings on appropriate substrates are well suited for high precision molding components requiring great dimensional stability over a wide operating temperature range. Products of the invention also find use e.g. in automotive, aerospace, electronic and sporting goods applications. Strong, ductile, lightweight, wear and corrosion resistant fine-grained coatings of low internal stress and low friction with excellent heat conductivity are deposited onto suitable substrates. The coefficient of thermal expansion between the coating and the permanent substrate can be closely matched to prevent premature failure e.g. by blistering, delamination or cracking during repeated temperature cycling within the operating temperature range of interest (73 K to 873 K).

A variety of fine-grained metallic coatings, which at room temperature have a coefficient of thermal expansion in the range between $-5.0 \times 10^{-6} K^{-1}$ and $25 \times 10^{-6} K^{-1}$, can be employed. Particularly suited are fine-grained high-strength pure metals or alloys containing one of Al, Cu, Co, Ni, Fe, Mo, Pt, Ti, W and Zr; alloys containing at least two elements selected from Al, Cu, Co, Ni, Fe, Mo, Pt, Ti, W and Zr; pure metals or alloys of Al, Cu, Co, Ni, Fe, Mo, Pt, W and Zr, further containing at least one element selected from Ag, Au, B, C, Cr, Mo, Mn, P, S, Si, Pb, Pd, Rh, Ru, Sn, V and Zn; and optionally containing particulate additions such as metal powders, metal alloy powders and metal oxide powders of Ag, Al, Co, Cu, In, Mg, Mo, Ni, Si, Sn, Pt, Ti, V, W, Zn; nitrides of Al, B and Si; C (graphite, carbon fibers, carbon nanotubes or diamond); carbides of B, Cr, Bi, Si, W; ceramics, glasses and polymer materials such as polytetrafluoroethylene (PTFE), polyvinylchloride (PVC), acrylonitrile-butadiene-styrene (ABS), polyethylene (PE), polypropylene (PP). The particulate average particle size is typically between 500 nm and 5 μm. The composition of the fine-grained metallic material as well as the volume fraction and chemistry of the particulate additions are chosen to achieve the CTE value desired for matching the coating CTEs to the CTEs of the substrate and to achieve the desired coating properties. It is understood in this context that matching of the substrate and fine-grained metallic coating CTEs does not necessarily mean that the respective CTEs are identical but that the "relative mismatch" between the CTE of the fine-grained metallic material and the CTE of the permanent substrate is minimized to the extent required to provide the desired thermal cycling durability for the particular application. The tolerable "CTE mismatch" depends on the application, the maximum and minimum operating temperature and the number of temperature cycles the article is required to withstand in its operating life. In addition, mechanical and chemical properties required in the specific application need to be taken into consideration as well. In all instances, after a predetermined number of thermal cycles, consisting either of submersing the article in liquid nitrogen for one minute followed by submersion in hot water for one minute, or the ANSI/ASTM specification B604-75 section 5.4 Thermal Cycling Test, the coating relative to the underlying substrate is displaced by less than 2% and no delamination takes place. The fine-grained coating furthermore does not blister or crack which would compromise the appearance or performance of the article.

DESCRIPTION OF PRIOR ART/BACKGROUND OF THE INVENTION

Carbon fiber precision composite tools, molds and dies are commonly used in industry, e.g. for fabricating carbon fiber reinforced composite prototypes in the aerospace industry. Various iron-nickel alloys (Invar®, Nilo®) have a low coefficient of thermal expansion (CTE) and are used in bulk form for molds and tooling for fabricating precision composite parts. Composite parts are made e.g. by building layers of carbon cloth fibers impregnated with resin on suitable tools or molds, followed by curing in an autoclave at around 450 K (thermoset epoxy parts) or up to 725 K (thermoplastic resins). After curing the composite part is removed from the tool and the process is repeated.

Carbon fiber composite mold tooling is relatively cheap, easy to fabricate and machine; however, it is not very durable and thus is only suitable for prototypes or limited production runs. Metallic molds e.g. made of Invar® or Nilo® provide increased strength and wear resistance and higher durability but are expensive. Metallic coatings can be applied to mold/tooling substrates made from carbon composites or polymeric materials, however, the close matching of the thermal expansion coefficient of the coating layer and the substrate limits the selection of metals to Invar$^R$ and Nilo$^R$ type alloys which do not possess the required mechanical strength and wear resistance to obtain the desired durability and service life, when applied as coatings versus bulk form.

In molding applications (blow, injection, compression molding and the like), for instance, it is desirable that the coefficient of thermal expansion (CTE) of the mold be it bulk metal or metal coating is closely matched to that of non-metallic (e.g. carbon fiber) composite component to avoid spring-back during heating and cooling due to CTE mismatch.

Various patents address the fabrication of molds/tooling using low CTE Invar (Ni-65% Fe alloy) to minimize material scrap generated and to reduce cost as compared to machining the die out of a metal block:

Kenney in U.S. Pat. No. 6,672,125 (2004) discloses a method for fabricating Invar based tooling by super plastically forming a tool from a planar Invar face sheet using a die with the predetermined contour. The diaphragm is heated to the super plastic temperature and pressure is applied to cause the Invar face sheet to form against the contour of the die. Super plastically forming the Invar face sheet results in a negligible amount of scrap compared to machining molds from a block and reduces the material and labor costs.

Covino in U.S. Pat. No. 5,817,267 (1998) discloses a method for fabricating a mold by providing a matrix having a shape to be molded, and spraying molten metal from a spray gun. Metals selected from the group of Fe, Ni, Zn, Al and Cu are deposited on the matrix, forming a shell, which is removed from the matrix and used as a mold. The process described reduces the cost of mold making when compared to machining large molds from solid blocks of particularly nickel alloys, containing 36-50% nickel, having a low coefficient of thermal expansion. As the thermal spray process used involves melting followed by resolidification the resulting coating is coarse grained.

Oyama in U.S. Pat. No. 5,453,173 (1995) discloses a three-dimensional electroformed shell for a mold consisting of a three-dimensional thin-walled body and an electroformed coating deposited on it. A process for manufacturing the shell is also disclosed. If the network body is made of a non-conductive material, electric conductivity is imparted to the surface e.g. by applying a conductive paint, electroless plating, vacuum evaporation or sputtering. The network body is coated with nickel using electrodeposition.

Carson in U.S. Pat. No. 3,867,264 (1975) discloses an electroforming process for replicating the surface contour of a master form. A pre-plate solution is coated on the form and comprises a combination of a metal compound capable of being reduced to its active metal constituent so as to form catalytic bonding sites for a further metal plating process, binder material comprising one or more polymer and/or polymer formers, and at least one solvent for the binder material and the metal compound. The binder material is chosen to provide a polymeric substance having poor adhesion for the form surface. The binder is dried to a polymer layer on the form and thereafter a conductive metal layer is electrolessly plated on the polymer layer. Subsequently, copper or nickel are electroplated onto the conductive layer to a desired thickness of at least 0.5 mil (12.5 μm), which is substantially greater than the thickness of the electrolessly-plated layer. In the final step the electroplated metal is removed from the form.

Various patents address the fabrication of sporting goods containing a metallic coating on a polymer substrate, particularly carbon fiber/epoxies:

Yanagioka in U.S. Pat. No. 4,188,032 (1980) discloses a nickel-plated golf club shaft made of fiber-reinforced material having on substantially its entire outer surface a metallic plating selected from the group consisting of nickel and nickel based alloys for the purpose of providing a wear-resistant coating. The electroless nickel coating of choice is 20 µm thick and the deposition time is 20 hrs, resulting in a deposition rate of 1 µm/hr.

Reed in U.S. Pat. No. 5,655,981 (1997) describes a shaft for a hockey stick comprising a non-metallic elongated material member; a first layer comprised of a resilient yet tough material bonded to the member; a second layer comprised of metal applied to the first layer by a metal deposition process; and a third layer comprised of a clear, resilient, tough material encasing said second layer of metal. The thin metallic layer is applied to the substrate by a vapor vacuum deposition process. The base layer, metallic layer and top layer have an overall thickness of less than about 3 mils. The purpose of the thin metallic layer applied to a non-metallic shaft, having a maximum thickness of 0.01 mil (0.25 µm), is entirely to enhance the appearance and the metals of choice include aluminum, copper, gold and silver.

Various patents address the fabrication of articles for a variety of applications:

Palumbo in U.S. Ser. No. 11/013,456 (2004), assigned to the same applicant, discloses articles for automotive, aerospace, manufacturing and defense industry applications including shafts or tubes used, for example, as golf club shafts, ski and hiking poles, fishing rods or bicycle frames, skate blades and snowboards that are at least partially electroplated with fine-grained layers of selected metallic materials using aqueous electrolytes. The articles are strong, ductile and lightweight and exhibit a high coefficient of restitution and a high stiffness. Suitable substrates to be coated include metallic and non-metallic materials. Suitable metal substrates include aluminum, titanium, steel, stainless steel, copper, brass, bronze, zinc, magnesium, tin and nickel, or their alloys. Non-metallic substrates include polymeric resin matrix composites employing materials including carbon fibers, ceramic matrix, aramid fibers, polyethylene fibers, boron, fiberglass, and various thermoplastics including, but not limited to, polypropylene, polyethylene, polystyrene, vinyls, acrylics, nylon and polycarbonates, among others.

Aldissi in U.S. Pat. No. 5,218,171 (1993) describes a method of fabricating wires and cables of low weight specifically for aerospace applications by silver coating an aramid fiber core to provide cables having about half the weight and about 15 times the tensile strength of cables having equivalent resistance and/or equivalently sized cores of silver plated copper. The metal coating is applied in two steps, namely by (1) electroless plating a high tensile strength fiber comprising nylon, aramid, etc., with a layer of a metal such as copper, silver; followed by (2) electroplating a second metal layer.

Burgess in U.S. Pat. No. 3,749,021 (1973) discloses a metal-plated plastic cartridge casing. A nickel or chromium metal film, preferably between 0.05 to 0.1 mils thick is plated onto a plastic cartridge case to increase the strength, abrasion and burn-through resistance as well as lubricity of the cartridge casing. The plastic casing may comprise a filled or a fiber reinforced plastic. A plated metal skin preferably 5 to 7 mils thick may also be employed in conjunction with non-reinforced plastic casings to increase the strength of the casing in selected areas.

Various patents disclose electroplating processes for the preparation of metallic coatings including Ni—Fe alloy coatings:

Tremmel in U.S. Pat. No. 3,974,044 (1976) discloses an aqueous nickel-iron alloy plating bath containing nickel ions and iron ions, a soluble non-reducing complexing agent, and a reducing saccharide selected from the group consisting of monosaccharides and disaccharides. The combination of hydroxy carboxylic acid complexers and reducing saccharide in such baths yielding high iron content bright level nickel-iron alloy deposits containing up to 50 percent iron, while retaining the $Fe+^3$ concentration in the bath at a minimum value and reducing the amount of complexing agents required. Generally, it is preferred to utilize from about 1 to about 50 grams per liter of a reducing saccharide and from about 2 to about 100 grams per liter of the complexing agent.

Luch in U.S. Pat. No. 4,195,117 (1980) discloses the use of nickel-iron alloy strike deposits on directly plateable plastics and plated objects suitable for severe and very severe service conditions according to ANSI/ASTM specification B604-75.

Erb in U.S. Pat. No. 5,352,266 (1994), and U.S. Pat. No. 5,433,797 (1995), assigned to the same applicant, describe a process for producing nanocrystalline materials, particularly nanocrystalline nickel. The nanocrystalline material is electrodeposited onto the cathode in an aqueous acidic electrolytic cell by application of a pulsed current. The cell also optionally contains stress relievers. Products of the invention include wear resistant coatings, magnetic materials and catalysts for hydrogen evolution.

Palumbo DE 10,288,323 (2005), assigned to the same applicant, discloses a process for forming coatings or free-standing deposits of nanocrystalline metals, metal alloys or metal matrix composites. The process employs tank, drum plating or selective plating processes using aqueous electrolytes and optionally a non-stationary anode or cathode. Novel nanocrystalline metal matrix composites are disclosed as well.

Park in WO04094699A1 (2004) discloses a process for producing nano Ni—Fe alloys with a Ni content in a range of 33 to 42 wt % by electroplating, specifically a nanocrystalline Invar alloy having a grain size of 5 to 15 nm. The aqueous electrolyte comprises, on the basis of 1 liter of water, 32 to 53 g of ferrous sulfate or ferrous chloride, a mixture thereof; 97 g of nickel sulfate, nickel chloride, nickel sulfamate or a mixture thereof; 20 to 30 g of boric acid; 1 to 3 g of sodium saccharin; 0.1 to 0.3 g of sodium lauryl sulfate; and 20 to 40 g of sodium chloride. The Fe—Ni alloys exhibit excellent mechanical properties compared to the conventional polycrystalline Fe—Ni alloy and a negative coefficient of thermal expansion.

Park in WO04074550A1 (2004) discloses an aqueous electrolyte for the preparation of nanocrystalline Ni—Fe alloys having a coefficient of thermal expansion of not more than $9 \times 10^{-6} K^{-1}$ by electrodeposition. The aqueous electrolyte comprises, on the basis of 1 liter of water, 25 to 73 kg of ferrous sulfate or ferrous chloride or a mixture thereof, 97 g of nickel sulfate or nickel chloride or nickel sulfamate or a mixture thereof, 20 to 30 g of boric acid, 1 to 3 g of sodium saccharin, 0.1 to 0.3 g of sodium lauryl sulfate, and 20 to 40 g of sodium chloride. The Ni content of the Fe—Ni alloy produced using said electrolyte lies in the range of 20% to 50 wt %.

Bukowski in DE 10108893A1 (2002) describes the galvanic synthesis of fine-grained (group II to V or the transition elements) metals, their alloys and their semiconductors compounds using ionic liquid or molten salt electrolytes.

Various patents disclose low temperature powder spray processes for the preparation of metallic coatings:

Alkhimov in U.S. Pat. No. 5,302,414 (1991) describes a cold gas-dynamic spraying method for applying a coating to an article by introducing metal or metal alloy powders, polymer powders or mechanical mixture thereof with a particle size ranging from about 1 to about 50 microns into a gas stream. The gas and particles form a supersonic jet having a velocity of from about 300 to about 1,200 m/sec and a temperature considerably below the fusing temperature of the powder material. The jet is directed against an article of a metal, alloy or dielectric, thereby coating the article with the particles.

Tapphom in U.S. Pat. No. 6,915,964 (2005) describes a process for forming coatings by solid-state deposition and consolidation of powder particles entrained in a subsonic or sonic gas jet onto the surface of an object. Under high velocity impact and thermal plastic deformation, the powder particles adhesively bond to the substrate and cohesively bond together to form consolidated materials with metallurgical bonds. The powder particles and optionally the surface of the object are heated to a temperature that reduces yield strength and permits plastic deformation at low flow stress levels during high velocity impact, but which is not so high as to melt the powder particles.

SUMMARY

This invention focuses on enhancing the mechanical strength and wear properties of fine-grained metallic coatings with an average grain size between 1 and 1,000 nm and metal matrix composite coatings exhibiting a coefficient of thermal expansion (CTE) in the range of $-5 \times 10^{-6} K^{-1}$ to $25 \times 10^{-6} K^{-1}$ at room temperature as e.g. indicated in Table 1 by grain refinement (Hall Petch Strengthening) and optionally by adding particulates to the coating. Metal matrix composites (MMCs) in this context are defined as particulate matter embedded in a fine-grained metal matrix. MMCs can be produced e.g. in the case of using an electroplating process by suspending particles in a suitable plating bath and incorporating particulate matter into the electrodeposit by inclusion or e.g. in the case of cold spraying by adding non-deformable particulates to the powder feed.

It is an objective of this invention to maintain the room temperature CTE of the fine-grained metallic coating as well as the room temperature CTE of the substrate in the range of $-5 \times 10^{-6} K^{-1}$ to $25 \times 10^{-6} K^{-1}$, preferably in the range of $-1 \times 10^{-6} K^{-1}$ to $15 \times 10^{-6} K^{-1}$ to enhance the thermal cycling performance of the article.

It is an objective of this invention to provide articles composed of fine-grained metallic coatings on substrates and multi-layer laminates composed of alternating layers of fine-grained coatings and substrates capable of withstanding 1, preferably 5, more preferably 10, more preferably 20 and even more preferably 30 temperature cycles between liquid nitrogen (T=~−196° C. for one minute) and hot water (T=~90° C. for one minute) without delamination and with a displacement of the coating relative to the underlying substrate of under 2%, preferably under 1% and even more preferably under 0.5%.

It is an objective of this invention to provide articles composed of fine-grained metallic coatings on substrates capable of withstanding 1, preferably 5, more preferably 10, more preferably 20 and even more preferably 30 temperature cycles without failure according to ANSI/ASTM specification B604-75 section 5.4 (Standard Recommended Practice for Thermal Cycling Test for Evaluation of Electroplated Plastics ASTM B553-71) for service condition 1, preferably service condition 2, preferably service condition 3 and even more preferably for service condition 4.

It is an objective of this invention to provide a means for matching of the CTE of the fine-grained metallic coating to the CTE of the substrate by adjusting the composition of the alloy and/or by varying the chemistry and volume fraction of particulates embedded in the metallic coating.

It is an objective of this invention to provide a fine-grained metallic coating containing elements selected from the group of Al, Cu, Co, Ni, Fe, Mo, Pt, Ti, W, Zn and Zr.

It is a further objective of this invention to provide fine-grained coatings composed of Fe alloyed with Co and/or Ni, having a minimum iron content of 5%; or 10%, a maximum iron content of 75%; 90% or 95%, a minimum combined nickel/cobalt content of 2.5%; 5% or 10% and a maximum combined nickel/cobalt content of 80%; 90% or 95%.

It is an objective of the invention to deposit 30 micron to 5 cm thick, fine-grained metal, metal alloy or metal matrix composite coatings and enhance at least one property selected from the group of strength, hardness, friction, scratch and wear resistance compared to coarse-grained coatings of the same composition. Metal matrix composites consist of fine-grained pure metals or alloys with suitable particulate additives such as powders, fibers, nanotubes, flakes, metal powders, metal alloy powders and metal oxide powders of Al, Co, Cu, In, Mg, Ni, Si, Sn, V, and Zn; nitrides of Al, B and Si; C (graphite, diamond, nanotubes, Buckminster Fullerenes); carbides of B, Cr, Bi, Si, W; and self lubricating materials such as $MoS_2$ or organic materials e.g. PTFE.

It is an objective of the invention to deposit fine grained-metallic materials onto a substrate by a process selected from electrodeposition, physical vapor deposition (PVD), chemical vapor deposition (CVD), gas condensation and cold spraying techniques.

It is an objective of the invention to use metallic and non-metallic substrates e.g. as indicated in Table 1 exhibiting a coefficient of thermal expansion (CTE) in the range of $-5 \times 10^{-6} K^{-1}$ to $25 \times 10^{-6} K^{-1}$, preferably in the range of $-1 \times 10^{-6} K^{-1}$ to $15 \times 10^{-6} K^{-1}$ at room temperature. Examples of suitable metallic substrates are coarse-grained and fine-grained metals and alloys of Al, Cu, Co, Ni, Fe, Mo, Pt, Ti, W and Zr. Examples of suitable non-metallic substrates are glass, polymeric resin composites or other filled polymeric materials including, but not limited to, ABS, polypropylene, polyethylene, polystyrene, vinyls, acrylics, nylon and polycarbonates with a CTE of no more than $25 \times 10^{-6} K^{-1}$ at room temperature. Suitable fillers include carbon, ceramics, oxides, carbides, nitrides, polyethylene, fiberglass and glass in suitable forms including fibers and powders.

It is an objective of the invention to apply the fine-grained metallic coating to at least a portion of the surface of a part made substantially of glass fiber composites or carbon/graphite fiber composites including carbon fiber/epoxy composites, optionally after metallizing the surface (layer thickness ≦10 micron, preferably ≦1 micron) with a thin layer of nickel, copper, silver or the like for the purpose of enhancing the electrical conductivity of the substrate surface. The fine-grained coating is always substantially thicker (>25 micron) than the metallized layer.

It is an objective of this invention to at least partially coat complex shapes with a metallic layer that is strong, stiff, lightweight and exhibits ductility in the range of 1-20%.

It is an objective of this invention to provide lightweight molds, mold components or tooling parts with increased strength, stiffness, durability, wear resistance, thermal conductivity and a low coefficient of thermal expansion.

It is an objective of this invention to deposit e.g. using electroplating, PVD, CVD or powder coating, fine-grained metallic materials onto carbon fiber composite substrates requiring little or no machining after deposition.

It is an objective of the invention to provide articles that are strong, wear and abrasion resistant, light-weight and can be manufactured by a convenient and cost-effective production process including electrodeposition, physical vapor deposition (PVD), chemical vapor deposition (CVD), gas condensation and cold spraying techniques.

It is an objective of this invention to provide articles including shafts, tubes or other suitable shapes e.g. for use as golf, arrow, hockey, ski or hiking pole shafts, fishing poles, bicycle frames, ammunition casings and other tubular structures e.g. with a circular cross section for use in sporting goods, automotive and industrial components and the like that are coated with fine-grained metallic layers that are lightweight, resistant to abrasion, resistant to permanent deformation, do not splinter when cracked or broken and are able to withstand thermal cycling without degradation.

It is an objective of this invention to at least partially coat the inner or outer surface of parts including complex shapes such as racquets (e.g. for tennis, squash, badminton, etc, baseball/softball bats, skis, golf club face plates and/or heads) or other sporting equipment, automotive components (e.g. grille guards, brackets, running boards) and industrial components with fine-grained metallic materials that are strong, lightweight, have high stiffness (e.g. resistance to deflection and higher natural frequencies of vibration) and are able to withstand thermal cycling without degradation.

It is an objective of the invention to provide golf clubs utilizing a graphite-epoxy/carbon fiber shaft coated with a fine-grained metallic layer chosen from the group of Ni, Co, Ni—Fe, Co—Fe and Ni—Co—Fe alloys that are lightweight, capable of achieving increased flight distance, providing improved vibration dampening and increased control over the club shaft and head by reducing the shaft torque, providing improved golf ball flying distance and accuracy characteristics and are able to withstand thermal cycling without degradation.

It is an objective of this invention to provide cables or wires e.g. for use in aerospace, automotive, sporting goods and other industrial applications that are lightweight, have a high breaking strength, are corrosion resistant, capable of withstanding thermal cycling without degradation and are resistant to abrasion and wear by applying a fine-grained surface coating with a yield strength of at least 300 MPa, preferably 500 MPa and more preferably over 750 MPa.

It is an objective of this invention to provide cables or wires, which at a breaking strength similar to conventional wires are more than 5%, preferably more than 10%, more preferably more than 20% and even more preferably more than 40% lighter than conventional uncoated wires and are able to withstand thermal cycling without degradation.

It is an objective of this invention to provide coated cables or wires capable of withstanding thermal cycling without degradation, wherein the fine-grained coating represents more than 5%, preferably more than 10%, more preferably more than 20% and even more preferably more than 40% and up to 90% of the of the cross sectional area or the total weight.

It is an objective of this invention to provide polymer-cased ammunition suitable for use in repeating firearms with reduced weight compared to conventional brass-cased ammunition.

Accordingly, the invention is directed to an article comprising:
(a) a permanent substrate which at room temperature has a coefficient of thermal expansion in the range between—$5.0 \times 10^{-6} K^{-1}$ and $25 \times 10^{-6} K^{-1}$;
(b) a fine grained metallic coating on the permanent substrate, having an average grain size between 2 and 1,000 nm, a thickness between 25 micron and 5 cm and a coefficient of thermal expansion in the range between $-5.0 \times 10^{-6} K^{-1}$ and $25 \times 10^{-6} K^{-1}$; and
(c) said article exhibiting no delamination and the displacement of the coating relative to the underlying substrate is less than 2% after said article has been exposed to one temperature cycle consisting of exposure to liquid nitrogen for one minute followed by exposure to 90° C. hot water for one minute, or one temperature cycle according to ASTM B553-71 service condition 1, 2, 3 or 4.

The article of the invention can be provided by a process for coating surfaces of a work piece after suitable surface preparation e.g. by sanding, grid blasting and/or etching, with fine-grained metallic materials of high yield strength (300 MPa to 2,750 MPa) and ductility (1-15%) and a low CTE. The term low CTE is used herein to mean no more than $25 \times 10^{-6} K^{-1}$.

According to one aspect of the present invention an article is provided by a process which comprises the steps of, positioning the metallic or metallized work piece to be plated in a plating tank containing a suitable electrolyte and a fluid circulation system, providing electrical connections to the work piece/cathode to be plated and to one or several anodes and plating a structural layer of metallic material with an average grain size of less than 1,000 nm on the surface of the metallic or metallized work piece using suitable direct current (D.C.) or pulse electrodeposition processes described e.g. in the copending application U.S. Ser. No. 10/516,300 (2004) (DE 10,288,323).

Articles of the invention comprise fine-grained coatings having low CTEs at high deposition rates, having a thickness of at least 0.025 mm, preferably more than 0.030 mm, more preferably more than 0.050 mm and even more preferably more that 0.100 mm deposited on substrates of matching CTEs including industrial products (e.g. molds), automotive products (e.g. running boards, grill guards), military products (e.g. ammunition, armor), sporting goods (e.g. golf club heads, inserts for golf club heads, face plates for golf clubs, shafts for golf clubs, arrows, hiking and skiing poles, walking sticks, lacrosse sticks).

Articles of the invention comprise a single or several fine-grained metallic layers applied to the substrate as well as multi-layer laminates composed of alternating layers of fine-grained metallic layers and substrates.

The fine-grained metallic coatings have a grain size under 1 μm (10,000 nm), preferably in the range of 5 to 500 nm, more preferably between 10 and 100 nm.

The fine-grained coatings have a modulus of resilience of at least 0.25 MPa, preferably at least 1 MPa, more preferably at least 2 MPa, more preferably at least 5 MPa and even more preferably at least 7 MPa.

In a preferred embodiment article of this invention, e.g., involving P containing coatings, the coatings are dispersion strengthened by a subsequent heat-treatment.

According to this invention, the entire article can be coated, alternatively patches or sections can be formed on selected areas only (e.g. golf club face plates or sections of golf club shafts, arrows or polymer cartridge casings), without the need to coat the entire article.

According to this invention patches or sleeves which are not necessarily uniform in thickness can be deposited in order to e.g. enable a thicker coating on selected sections or sections particularly prone to heavy use such as golf club face or sole plates, the tip end of fishing poles, arrows and shafts for golf clubs, skiing or hiking poles, polymer cartridge casings and the like.

According to this invention fine-grained metal coated carbon-fiber composite molds and their components with low thermal expansion characteristics can be formed. Carbon fiber composite molds are popular for fabricating composite prototypes for the aerospace industry. While carbon-fiber molds are cheap, they are, however, not very durable and find use only for prototyping. Depositing fine-grained metals such as Ni—Fe alloys directly onto the carbon fiber composite molds provides for tremendous cost savings over the traditional approach of machining and forming Invar molds which are durable enough to be used for production runs. The fine-grained metal coated carbon-fiber composite molds provide an added benefit over traditional Invar molds, namely the high strength of the fine-grained coating allows for thinner wall thicknesses and reduced overall weight while providing increased durability and wear resistance.

The following listing further defines the article of the invention:

Fine-Grained Coating and Substrate Specification:

Minimum coefficient of thermal expansion $[10^{-6}K^{-1}]$: −5.0; −1.0; 0

Maximum coefficient of thermal expansion $[10^{-6}K^{-1}]$: 15; 20; 25

Fine-Grained Coating Specification:

Minimum average grain size [nm]: 2; 5; 10

Maximum average grain size [nm]: 100; 500; 1,000

Metallic Layer Thickness Minimum [μm]: 25; 30; 50; 100

Metallic Layer Thickness Maximum [mm]: 5; 50

Minimum Ratio Coating Thickness to Grain Size: 25; 100; 1,000

Maximum Ratio Coating Thickness to Grain Size: 10,000; 100,000; 12,500,000

Metallic Materials Al, Cu, Co, Ni, Fe, Mo, Pt, Ti, W and Zr

Alloying additions: Ag, Au, B, Cr, Mo, P, Pb, Pd, Rh, Ru, Sn, Zn

Particulate additions: metals (Ag, Al, Cu, In, Mg, Si, Sn, Pt, Ti, V, W, Zn); metal oxides ($Ag_2O$, $Al_2O_3$, $SiO_2$, $SnO_2$, $TiO_2$, ZnO); carbides of B, Cr, Bi, Si, W; carbon (carbon nanotubes, diamond, graphite, graphite fibers); glass; polymer materials (PTFE, PVC, PE, PP, ABS, epoxy resins)

Minimum Particulate Fraction [% by volume]: 0; 1; 5; 10

Maximum particulate fraction [% by volume]: 50; 75; 95

Minimum specific tensile strength [kpsi per lb/cu.in]: 25; 50; 100;

Maximum specific tensile strength [kpsi per lb/cu.in]: 250; 500; 750

Minimum Yield Strength Range [MPa]: 300

Maximum Yield Strength Range [MPa]: 2750

Minimum Modulus of Resilience (as defined in U.S. Ser. No. 11/013,456) of the

Fine-Grained Metallic Layer [MPa]: 0.25; 1

Maximum Modulus of Resilience of the

Fine-Grained Metallic Layer [MPa]: 12; 25

Minimum Hardness [VHN]: 100, 200, 400

Maximum Hardness [VHN]: 800, 1000; 2000

Minimum Deposition Rates [mm/hr]: 0.01; 0.05; 0.1; 0.2; 0.5

Substrate Specification:

Metallic Materials: coarse-grained or fine-grained metallic materials including Al, Cu, Co, Ni, Fe, Mo, Pt, Ti, W and Zr with optional alloying additions of Ag, Au, B, Cr, Mo, P, Pb, Pd, Rh, Ru, Sn, Zn and optional particulate additions of metals (Ag, Al, Cu, In, Mg, Si, Sn, Pt, Ti, V, W, Zn); metal oxides ($Ag_2O$, $Al_2O_3$, $SiO_2$, $SnO_2$, $TiO_2$, ZnO); carbides of B, Cr, Bi, Si, W; carbon (carbon nanotubes, diamond, graphite, graphite fibers); ceramics; lass; polymer materials (PTFE, PVC, PE, PP, ABS, epoxy resins).

Non-Metallic Materials: glass, ceramics, filled polymeric materials and composites, carbon based materials selected from the group of graphite, graphite fibers and carbon nanotubes.

Thermal Cycling Performance Specification:

ANSI/ASTM specification B604-75 section 5.4 Test (Standard Recommended Practice for Thermal Cycling Test for Evaluation of Electroplated Plastics ASTM B553-71). The samples are subjected to a thermal cycle procedure as indicated in Table 2. The sample is held at the high temperature for an hour, cooled to room temperature and held at room temperature for an hour and subsequently cooled to the low temperature limit and maintained there for an hour.

TABLE 2

Standard Recommended Practice for Thermal Cycling Test for Evaluation of Electroplated Plastics According to ASTM B553-71

| Service Condition | High Limit | Low Limit |
| --- | --- | --- |
| 1 (mild) | 60° C. | −30° C. |
| 2 (moderate) | 75° C. | −30° C. |
| 3 (severe) | 85° C. | −30° C. |
| 4 (very severe) | 85° C. | −40° C. |

Alternative temperature cycling test: The article is cycled between liquid nitrogen (~−196° C. for one minute) and hot water (~90° C. for one minute). If any blistering, delamination or cracking is noted the test is immediately suspended. After 10 such test cycles the sample is allowed to cool to room temperature, is carefully checked for delamination, blistering and cracking and the total displacement of the coating relative to the substrate is determined.

PREFERRED EMBODIMENTS OF THE INVENTION

This invention relies on fine-grained coatings produced, for example, by DC or pulse electrodeposition, physical vapor deposition (PVD), chemical vapor deposition (CVD), gas condensation and cold spraying techniques.

The person skilled in the art of plating will know how to electroplate selected fine-grained metals, alloys or metal matrix composites choosing suitable plating bath formulations and plating conditions. Similarly, the person skilled in the art of PVD, CVD, gas condensation and cold spraying techniques will know how to prepare fine-grained metal, alloy or metal matrix composite coatings.

Selecting a suitable substrate and increasing the strength of the metallic coating through grain-size reduction minimizes the overall thickness and weight of articles. Depending on the ductility required a grain size in the range of 10 to 500 nm usually results in a coating with suitable mechanical properties. Incorporating a sufficient volume fraction of particulates can further enhance the material properties and reduce the CTE of the coating.

Depending on the requirements of the particular application the material properties can also be further altered, e.g., by incorporating solid particles. Metal matrix composites provide added flexibility to adjust the CTE and affect mechanical and optionally even functional properties (e.g. lubricants such as $MoS_2$ and PTFE).

As noted above, particularly suited applications of the fine-grained layers disclosed herein include molds, golf shafts, ski poles, fishing rods, arrows and other structures comprised of a conventional metal, plastic or graphite composites that are coated on at least part of the interior and/or exterior surfaces. Conventional metals e.g. aluminum, copper, nickel and their alloys are relatively soft and permanently deform and break easily as a result of the bending loads encountered during use. Furthermore these conventional materials exhibit a low resistance to abrasion and cut or scratch easily and can therefore benefit greatly from the substantial grain refinement described in this invention.

Carbon fiber composites possess much higher rigidity and lower density than steel; however, the light-weight, carbon-fiber golf shafts often exhibit torque or twisting of the club head relative to the shaft on down-swing and particularly at ball contact, resulting in poor accuracy and flying distance. This limitation can be overcome by coating at least 10% of the composite shaft's external and/or internal surface with the fine-grained metallic layer described.

The solid particles dispersed throughout the fine grained metal layer optionally include a particulate (e.g. carbon/graphite powder, carbon nanotubes, flakes or fibers, diamond, $TiO_2$, WC, $B_4C$) to reduce the CTE and optionally improve hardness, wear resistance and tensile strength.

Suitable non-metallic materials for use as substrates are listed in Table 1 and include resin matrix composites such as carbon fibers, aramid fibers, polyethylene fibers, ceramics, boron, fiberglass, various reinforced or filled thermoplastics including, but not limited to, polypropylene, polyethylene, polystyrene, vinyls, acrylics, nylon and polycarbonates, among others.

Electrodeposition is a particularly suited and economic deposition process when electrically conductive metal or graphite-containing substrates are employed. It will be known to a person skilled in the art that appropriate surface preparation is required to ensure appropriate adhesion of the coating to the substrate, particularly if the coating does not encapsulate the substrate. If the adhesion of the coating as applied is already poor at room temperature as can be determined, e.g. by any suitable peel test, the coated article can still fail thermal cycling tests even though the CTEs of the fine-grained coating and the substrate are matched as described. Non-conductive or poorly-conductive substrates can be rendered suited for electroplating by applying a thin layer (typically less than 25 μm thick, more typically less than 2 μm) of a conductive material e.g. by electroless deposition of metals such as Ni, Cu and Ag or applying electrically conductive paints by various suitable means. Alternatively, other deposition processes can be employed to yield fine-grained coatings.

The intermediate conductive layer can comprise a metallic layer or can comprise polymeric material with conductive particulates therein.

Where the intermediate conductive layer comprises a metallic layer, the metallic layer is constituted of Ag, Ni or Cu or a combination of any two or all of these, and the intermediate conductive layer can be deposited by electroless deposition, sputtering, thermal spraying, chemical vapor deposition, physical vapor deposition of by any two or more of these.

Where the intermediate conductive layer comprises polymeric material with conductive particulates therein, it can be, for example, a conductive paint or a conductive epoxy. The conductive particulates can be composed of or contain Ag, Ni or Cu or graphite or other conductive carbon or a combination of two or more of these.

The invention is illustrated by the following working examples.

EXAMPLE 1 n-Ni Coated Graphite Composite

Penley Graphite Light LS® S-Flex and Penley G2-85® X-Flex graphite/epoxy golf shafts were used ($OD_1$=0.586", tapering down to $OD_2$=0.368" over a length of 40.5"). The shafts were stripped of the paint, ground with P1000 sandpaper to remove the surface coating and expose the carbon fibers. The surface roughness of the shaft after surface preparation was determined to be Ra~0.45 micron. The outer surface of the shaft was coated with various materials to a coating thickness of ~50 micron by depositing fine-grained Ni and NiFe alloys from a modified Watts nickel bath and using a Dynatronix (Dynanet PDPR 20-30-100) pulse power supply as described in U.S. Ser. No. 11/013,456. The fine-grained coating represented 22% of the total weight of the shaft. Coated samples taken from the untapered butt end area were exposed to a thermal cycling test which involves submersing about 4-8" long samples vertically into liquid nitrogen (T=−196° C.) for one minute, immediately followed by submersion in hot water (T=90° C.) for one minute. The sample is inspected for delamination, blistering, cracks and the like and the relative displacement of the coating determined every ten cycles. Thirty such thermal cycles were performed. In addition, another set of samples was exposed to 30 thermal cycles according to the ANSI/ASTM specification B604-75 section 5.4 Thermal Cycling Test for Service Condition 4 (85° C. to −40° C.). The data are displayed in Table 3 and indicate that a significant reduction in the displacement occurs if the CTEs of the substrate and the fine-grained metallic coating are matched. Moreover, all samples passed the liquid nitrogen/hot water cycling test without delamination. Similar results can be obtained when the fine-grained metallic coatings are deposited by other processes e.g. by low temperature spraying of powders resulting in a coating with a grain size in the 1 to 1,000 nm range. In all cases it was found that the degree of displacement can be reduced by reducing the differences in CTEs between the fine-grained coating and the substrate.

TABLE 3

Thermal Cycling Test Results

| Substrate Chemistry | Substrate CTE [10⁻⁶ K⁻¹] | Coating Chemistry | Coating CTE [10⁻⁶ K⁻¹] | Coating Grain Size [nm] | Thermal Cycling Test (−196 to 90° C.) Performance after 30 cycles/ Displacement ΔL/L [%] | ANSI/ASTM specification B604-75 section 5.4 Thermal Cycling Test/SC4; 30 cycles |
|---|---|---|---|---|---|---|
| Graphite/Epoxy Composite | 3.5 | 100Ni-0Fe | 13 | 20 | Pass/0.45 | Pass |
| Graphite/Epoxy Composite | 3.5 | 80Ni-20Fe | 10.8 | 15 | Pass/0.46 | Pass |
| Graphite/Epoxy Composite | 3.5 | 38Ni-62Fe | 2.5 | 15 | Pass/0.15 | Pass |

To investigate the effect of increasing metal content, hybrid graphite/metal golf shafts were prepared with the weight of the fine grained coating representing between 10 and 90% of the total weight of the shaft. The torsional stiffness per unit weight of the shafts containing the fine-grained metallic coating improved by at least about 5% when compared to the torsional stiffness of the same article not containing the metallic coating. The torque and deflection data indicate that a significant performance improvement can be obtained by increasing the relative metal weight of the composite graphite/metal shafts. Graphite/metal composite golf shafts incorporating a metallic coating representing at least 5%, preferably more than 10% and even more preferably more than 20% of the total weight provide a substantial improvement over the performance of uncoated graphite shafts. Selected coated shaft samples were exposed to both thermal cycling tests described above. The data indicated that matching the CTEs of the fine-grained metallic coating to the graphite-epoxy substrate provided acceptable thermal cycling performance, no delamination occurred and the relative displacement between the coating and the substrate was less than 0.75% in all cases.

EXAMPLE 2

Arrow Shafts; NiFe on Graphite/Epoxy

Over time archery arrows progressed from being made out of wood to aluminum. Aluminum arrows are about 25% lighter than cedar wood arrows but with repeated use aluminum arrows tend to bend causing inconsistent trajectories and loss in accuracy. More recently graphite-composite arrows appeared. Those being made from carbon fibers/ polyvinyl or polyester resins. Graphite-composite arrows are lighter and tougher than aluminum and they do not bend when striking a hard object. The lighter weight also leads to increased speed resulting in delivering higher kinetic energy on impacting the target. State of the art graphite composite arrows, however, also have a number of limitations. They tend to oscillate along the shaft, causing inaccuracies in flight and reduced penetration after hitting game. Due to the relatively limited "spine weight" and their low stiffness it is difficult to use them with bows with more than 50 lb draw weight. Furthermore, upon penetrating the target the friction generated heats up the tip section of the shaft to a temperature of over 150 to 200° C., which is significantly above the maximum temperature the graphite fiber/epoxy composite is able to withstand, resulting in degradation of the graphite fiber/epoxy composite shaft, deterioration of its performance and ultimately failure of the shaft. To improve the shaft thermal cycling performance and reduce the impact damage in the tip section 30" carbon-epoxy/fiberglass test shafts were reinforced with an outer layer (thickness: 0.004") of a fine-grained Ni-20Fe alloy in the tip section. The fine-grained reinforcement layers extended part of the way (e.g. 4") or all the way up the length of the base shaft making the shaft more resistant to impacts. The enhanced thermal conductivity distributes the heat of friction generated upon impacting the target over a much larger surface thereby reducing the maximum temperature the graphite fiber/epoxy composite is exposed to and thus durability is increased. The same basic deposition procedure as described in U.S. Ser. No. 10/516,300 for a modified Watt's bath for NiFe was followed for coating all the arrow shafts with a fine-grained Ni-20Fe material with an average grain size of 20 nm. After the portion of the shaft to be plated was abraded and metallized by a chemical silver spray, a fine-grained Ni-20Fe layer was plated onto the outside surface. Test samples were prepared with the fine-grained Ni-20Fe coating representing between 1 and 50% of the total arrow weight. The shafts were fitted with field tips, nocks and suitable vanes and submitted to tests using a compound bow with a draw weight of 60 lb. Overall the arrows containing the fine-grained metallic coating consistently outperformed the uncoated arrows. Samples with a fine-grained metal layer of at least 5% of the total weight of the arrow displayed a performance superior to that of conventional graphite fiber/epoxy and aluminum arrow shafts. Reinforcing the arrow shaft in the tip section (2" to 8") with a 0.001"-0.008" thick fine-grained coating proved particularly beneficial. Selected coated shaft samples were exposed to the thermal cycling tests described in Example 1. The data displayed in Table 4 indicate that matching the CTEs of the fine-grained metallic coating to the substrate provided acceptable thermal cycling performance.

TABLE 4

Thermal Cycling Test Results

| Substrate Chemistry | Substrate CTE [$10^{-6}$ K$^{-1}$] | Coating Chemistry | Coating CTE [$10^{-6}$ K$^{-1}$] | Coating Grain Size [nm] | Thermal Cycling Test (−196 to 90° C.) Performance after 30 cycles/ Displacement ΔL/L [%] | ANSI/ASTM specification B604-75 section 5.4 Thermal Cycling Test/SC4; 30 cycles |
|---|---|---|---|---|---|---|
| Graphite/Epoxy Composite | 5 | 80Ni-20Fe | 11 | 15 | Pass/~0 | Pass |

Similarly, aluminum arrow shafts were coated with fine-grained aluminum (average grain size 20 nm) according to DE 10108893A1 and exposed to thermal cycling testing. The results confirmed that matching the CTEs of the fine-grained metallic coating to the substrate provided acceptable thermal cycling performance.

EXAMPLE 3

Graphite Molds 2.5×0.75" coupons of various substrates were suitable pretreated, etched and coated with various fine-grained materials available from Integran Technologies Inc. (www.integran.com) to a coating thickness of ~100 micron. Substrate materials included graphite/epoxy used for precision molds, aluminum and ABS plastic (unfilled) as used, e.g., for sporting equipment and automotive components. After appropriate chemical activation, fine-grained NiFe and NiFeCo alloys were deposited from a modified Watts bath as described in U.S. Ser. No. 10/516,300. The coated samples were exposed to the harsh thermal cycling test described above. The data displayed in Table 5 indicate that matching the CTEs of the fine-grained metallic coating to the substrate provided acceptable thermal cycling performance. The Ni—Fe coating on the unfilled ABS substrate, representing a "CTE mismatch" outside the scope of this invention, failed instantly by complete delamination upon insertion of the sample into the liquid nitrogen.

TABLE 5

Thermal Cycling Test Results

| Substrate Chemistry | Substrate CTE [$10^{-6}$ K$^{-1}$] | Coating Chemistry | Coating CTE [$10^{-6}$ K$^{-1}$] | Thermal Cycling Test (−196 to 90° C.) Performance after 30 cycles |
|---|---|---|---|---|
| Graphite/Epoxy Composite | 1 | 80Ni-20Fe (20 nm) | 11 | Pass |
| Graphite/Epoxy Composite | 1 | 54.3Ni-15.6Co-30.3Fe (20 nm) | 11 | Pass |
| Graphite/Epoxy Composite | 1 | 60.4Ni-1.1Co-38.5Fe (20 nm) | 11 | Pass |
| Graphite/Epoxy Composite | 1 | 57.2Ni-1.7Co-41.1Fe (20 nm) | 11 | Pass |
| Graphite/Epoxy Composite | 1 | 30Ni-70Fe (20 nm) | 4 | Pass |
| Aluminum | 23 | 80Ni-20Fe (20 nm) | 11 | Pass |
| Aluminum | 23 | 60.4Ni-1.1Co-38.5Fe (20 nm) | 11 | Pass |
| Aluminum | 23 | 30Ni-70Fe (20 nm) | 4 | Pass |
| ABS, unfilled | 74 | 50Ni-50Fe (20 nm) | 10 | Fail (on 1st cycle by delamination) |

EXAMPLE 4

Ni—P, Co—P on Mild Steel; Faceplate Coating

A mild-steel faceplate insert for a golf club driver head was coated using a selective plating unit available from Sifco Selective Plating (www.brushplating.com). Standard substrate cleaning and chemical activation procedures provided by Sifco Selective Plating were performed. Using the anode brush with manual operation, 125 μm thick nanocrystalline Ni~0.6 wt % P and Co~0.8 wt % P layers were deposited onto face plate areas of about 3 in$^2$ at a deposition rate of 50 μm/hr. The electrolyte used comprised a modified Watts bath for Ni and Co, respectively, with phosphorous acid and saccharin additions as taught in DE 10,288,323. Selected electroplating conditions and metallic layer properties used are summarized in Table 6. After plating, the faceplate was heat-treated as indicated to further enhance the mechanical properties by precipitation hardening. No delamination occurred as a consequence of the heat-treatment in any sample.

TABLE 6

Coating Properties

| Fine-Grained Coating | Ni-0.6P | Co-0.8P |
|---|---|---|
| Average Coating Thickness: [μm] | 125 | 125 |
| Average Grain Size: [nm] | 13 | 12 |

TABLE 6-continued

Coating Properties

| Fine-Grained Coating | Ni-0.6P | Co-0.8P |
|---|---|---|
| Ratio Coating Thickness/Grain Size | 9,615 | 10,417 |
| Hardness [VHN] | 780 | 580 |
| Hardness after Heat Treatment (400° C./20 min) [VHN] | 890 | 720 |
| Hardness after Heat Treatment (400° C./20 min + 200° C./11 hrs) [VHN] | 1010 | — |

As coated samples with and without heat-treatment were exposed to a thermal cycling test described in Example 1 involving submersing the samples into liquid nitrogen (T=−196° C.) for one minute, followed by submersion in hot water (T=90° C.) for one minute. Table 7 indicates that after 30 thermal cycles no delamination occurred and the displacement of the coating relative to the underlying substrate was substantially zero in all cases.

TABLE 7

Thermal Cycling Test Results

| Substrate Chemistry | Substrate CTE [$10^{-6}$ K$^{-1}$] | Coating Chemistry | Coating CTE [$10^{-6}$ K$^{-1}$] | Coating Grain Size [nm] | Thermal Cycling Test (−196 to 90° C.) Performance after 30 cycles/ Displacement ΔL/L [%] |
|---|---|---|---|---|---|
| Mild Steel | 15 | Ni-0.6P, as plated | 11 | 13 | Pass/~0 |
| Mild Steel | 15 | Ni-0.6P, after HT (400° C./20 min) | 11 | 13 | Pass/~0 |
| Mild Steel | 15 | Co-0.8P, as plated | 11 | 12 | Pass/~0 |
| Mild Steel | 15 | Co-0.8P, after HT (400° C./20 min) | 11 | 12 | Pass/~0 |

Similarly, mild steel faceplates can be coated by cold spraying with fine-grained Ni (average grain size ~50 nm) according to U.S. Pat. No. 5,302,414 using a Ni powder feed (average particle size ~1 micron, average grain size ~20 nm) and exposed to thermal cycling testing. The results indicated that matching the CTEs of the fine-grained metallic coating to the substrate provided acceptable thermal cycling performance.

EXAMPLE 5

Co—P-Diamond MMCs

To illustrate the ability to "tailor make" the CTE of fine grained coatings, metal matrix composites were prepared as described in DE 10,288,323. Specifically, the electrolyte formulation used included 300 g/l CoSO$_4$×7H$_2$O; 45 g/l CoCl$_2$×6H$_2$O; 45 g/l H$_3$BO$_3$; 2 g/l Saccharin; 0.1 g/l Sodium Lauryl Sulfonate (SLS); 5 g/l Phosphorous Acid; (pH 1.5; Electrolyte temperature: 85° C.; Electrolyte circulation rate: 0.15 liter/min/cm$^2$ cathode area). To synthesize the metal matrix composite 50 g/l of sub-micron sized synthetic diamond particulate (mean particle size ~750 nm) was added to bath along with 1 g/l of standard commercial surfactant. A fine-grained CoP-Diamond composite layer, approximately 125 μm thick, was electroformed onto a 4" length of 0.25" diameter plastic mandrel (pre-metalized with ~5 μm of Cu) using a DC current of 150 mA/cm2 and a total plating time of 1 hour. 33 vol % of diamond particulate was incorporated into the fine-grained cobalt-phosphorus matrix and the resulting effect of these additions on the CTE of the coating was determined using a quartz dilatometer test method based on ASTM standard E228. Table 8 indicates that the CTE of coating can be varied depending on the choice and amount of the particulate added.

TABLE 8

Coefficient of Thermal Expansion of Selected Fine-Grained Metal Matrix Composites

| Fine Grained Coating Chemistry | Particulate Addition | Particulate Addition [% Volume] | Coating Grain Size [nm] | Coating CTE [$10^{-6}$ K$^{-1}$] |
|---|---|---|---|---|
| Co-2 wt % P | N/A | 0 | 15 | 12.9 |
| Co-2 wt % P | Diamond | 33 | 15 | 8.9 |

EXAMPLE 6 n-Ni Coated Wire

Ever more demanding performance requirements are being imposed onto traditional electrical wires and cables in a number of applications including aerospace applications, where the need for lighter weight wiring is directly related to aircraft performance and operating cost. A new approach to improve the strength of wires or cables by plating a conventional metal wire with a fine-grained metal, metal alloy or metal-matrix composite coating is presented here. In a number of aerospace applications the electrical conductivity required (resistivity: 67 Ω/10000 ft) would enable the use of 28AWG Cu wire (0.48 lb/1000 ft); however, as the required nominal breaking strength is over 30 lb, 22 AWG wire (1.94 lb/1000 ft) has to be used, significantly increasing the weight of the cabling. To demonstrate the benefits of strong, fine-grained coatings on the overall performance of Cu wires, fine-grained or coarse-grained Ni coatings were applied to 24 AWG to 28 AWG Cu wires by electrodeposition in a modified Watts nickel bath and using a Dynatronix (Dynanet PDPR 20-30-100) pulse power supply. Electrolyte composition and plating conditions were the same as in Example 1. The plating cell employed was similar to the continuous wire plating cell disclosed in U.S. Pat. No. 5,342,503. The properties of the samples are summarized in Table 9.

The data presented in Table 9 indicate that the breaking strength of 22 AWG Cu wire can be achieved by 24 AWG Cu wire coated with fine-grained Ni (coating volume fraction 23%) with a 18% reduction in weight or by 28 AWG Cu wire coated with fine-grained Ni (coating volume fraction 61%) with a 36% reduction in weight. A conventional, coarse-grained Ni-coating based on a commercial Sulfamate Ni plating bath, on the other hand, provides no benefit; on the contrary, the total weight actually increases in order to match the breaking strength of the conventional Cu-wire.

TABLE 9

Sample Wire Property Comparison

|  | Conventional 22 AWG Cu Wire | Conventional 24 AWG Cu Wire | Conventional 28 AWG Cu Wire | This invention; n-Ni Coated 24 AWG Cu Wire (grain size ~20 nm) | Coarse-grained Ni coated Cu 24 AWG Wire (grain size >10 μm) | Coarse-grained Ni coated Cu 24 AWG Wire (grain size >10 μm) | This invention; n-Ni Coated 28 AWG Cu Wire (grain size ~20 nm) | Coarse-grained Ni coated 28 AWG Cu Wire (grain size >10 μm) | Coarse-grained n-Ni Coated 28 AWG Cu Wire (grain size >10 μm) |
|---|---|---|---|---|---|---|---|---|---|
| Ni Coating Thickness [mils] | 0 | 0 | 0 | 1.43 | 1.43 | 3.99 | 3.79 | 3.79 | 6.67 |
| Volume Fraction of the Coating [%] | 0 | 0 | 0 | 23 | 23 | 49 | 61 | 61 | 76 |
| Total Diameter [mils] | 25.3 | 20.1 | 12.6 | 23 | 23 | 28.1 | 20.2 | 20.2 | 25.9 |
| Total Wire Weight [lb/1000 ft] | 1.94 | 1.22 | 0.48 | 1.60 | 1.60 | 2.39 | 1.24 | 1.24 | 2.04 |
| Breaking Strength, lb | 34.1 | 21.7 | 8.64 | 34.1 | 21.7 | 34.1 | 34.1 | 19 | 34.1 |
| Weight Savings at Equivalent Breaking strength) [%] | — | — | — | 18 | N/A | −23 | 36 | N/A | −5 |
| Nominal Resistance [Ω/1000 ft] | 16.9 | 26.7 | 67.8 | ~26 | 25.6 |  | ~65 | 60 |  |

Table 10 illustrates the weight savings achievable on wires and cables requiring a breaking strength of 34 lb by applying fine-grained Ni coatings of various thicknesses to conventional Cu wires.

TABLE 10

Characteristics of Round Copper Wire coated with Fine-Grained Nickel (average grain size 20 nm)

| Conductor size [AWG] | Fine-grained Ni Coating thickness [mils] | Volume fraction fine-grained Ni [%] | Nominal breaking strength [lb] | Net weight, [lb/1000 ft] | Weight savings over 22 AWG Cu Wire [%] |
|---|---|---|---|---|---|
| 22 | 0 | 0 | 34.1 | 1.940 | — |
| 23 | 0.725 | 12 | 34.1 | 1.755 | 10% |
| 24 | 1.43 | 23 | 34.1 | 1.600 | 18% |
| 25 | 2.07 | 34 | 34.1 | 1.473 | 24% |
| 26 | 2.69 | 44 | 34.1 | 1.373 | 29% |
| 27 | 3.26 | 53 | 34.1 | 1.303 | 33% |
| 28 | 3.79 | 61 | 34.1 | 1.236 | 36% |

Selected samples of the fine grained Ni coated 24 ASW Cu wires were subjected to both thermal cycling tests described earlier. In both cases, 30 thermal cycles were successfully completed without any delamination and the displacement of the coating relative to the underlying substrate was substantially zero in all cases.

Alternatively, this example can be carried out by CVD or PVD, e.g., using a reel-to-reel system.

EXAMPLE 7

Polymer cartridges; NiFe on Filled Nylon

Ammunition containing plastic components including polymer cartridge casings are known but to date have not been produced economically in commercial quantities with acceptable safety and consistent ballistic characteristics. Lightweight, polymer-cased ammunition utilizing standard projectiles, primers, and propellants have the potential to significantly reduce the weight of ammunition. Deficiencies encountered to date include:

the possibility exists that the projectile can be pushed into the cartridge casing or fall out;

moisture uptake and sealing problems can occur failing to keep the propellant dry;

a poor fit in the chamber can cause problems with inconsistent projectile accuracy due to the variation in the gas pressure during firing;

during the residence time of the cartridge in the weapon (after chambering and before firing) the cartridges can be exposed for some time to high temperatures of up to 200 or even 300° C. e.g. in automatic weapons which can degrade the polymer;

when fired plastic casings can permanently deform or provide insufficient elastic spring back causing difficulties during extraction;

portions of the polymer cartridge casing can break off or disintegrate upon firing;

problems can be encountered with ease and reliability of spent polymer cartridge extraction requiring a metal base or a metal insert;

jamming in automatic weapons can occur particularly during ejection of the casing;

insufficient lubricity of the casing fails to ensure reliable extraction and ejection; and excessive cost can be incurred due to complex designs and manufacturing processes required.

To demonstrate the performance of composites made of fine-grained metallic materials with polymers 5.6 mm (.223 caliber) polymer ammunition casings made of glass-filled Zytel® (CTE: $22 \times 10^{-6} K^{-1}$) were used and were reinforced by a fine-grained metallic layer. Prior to plating, the outside diameter of the casing to be plated was reduced to accommodate 0.001" to 0.010" thick coatings without changing the outer diameter. No adjustments were made to the inner diameter of the casing in case the inside surface was plated.

The same basic procedure as described in Example 2 was followed for coating all the polymer ammunition casings with fine-grained Ni-20Fe with an average grain size of 20 nm and a CTE of $11 \times 10^{-6} K^{-1}$. After the portion of the casing to be plated was metallized by silver spraying, a fine-grained Ni-20Fe layer was plated onto the outside casing from the base to between about half to the entire overall length. Test samples were prepared with the fine-grained metallic coating representing between 1 and 50% of the total casing weight. The casings were fitted with primers, suitable powder charges and 55 grain FMJ projectiles and submitted to test firing in an M-16 weapon. The performance of the cartridges with respect to chambering, ejecting and accuracy was monitored. Selected samples were subjected to the two thermal cycling test described. In both cases, 30 thermal cycles were successfully completed without any delamination and the displacement of the coating relative to the underlying substrate was substantially zero in all cases.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. An article comprising
   (a) a permanent substrate which at room temperature has a coefficient of thermal expansion in the range between $-5.0 \times 10^{-6} K^{-1}$ and $25 \times 10^{-6} K^{-1}$;
   (b) a fine grained metallic coating on the permanent substrate, having an average grain size between 2 and 1,000 nm, a thickness between 25 micron and 5 cm and a coefficient of thermal expansion in the range between $-5.0 \times 10^{-6} K^{-1}$ and $25 \times 10^{-6} K^{-1}$; and
   (c) said article exhibiting no delamination and the displacement of the coating relative to the underlying substrate is less than 2% after said article has been exposed to one temperature cycle consisting of exposure to liquid nitrogen for one minute followed by exposure to 90° C. hot water for one minute, or one temperature cycle according to ASTM B553-71 service condition 1, 2, 3 or 4.

2. An article according to claim 1 wherein said fine-grained metallic coating is selected from the group of:
   (i) A pure metal selected from the group consisting of Al, Cu, Co, Ni, Fe, Mo, Pt, Ti and Zr;
   (ii) an alloy containing at least two elements selected from Al, Cu, Co, Ni, Fe, Mo, Pt, Ti and Zr;
   (iii) pure metals selected from the group of Al, Cu, Co, Ni, Fe, Mo, Pt, Ti and Zr and alloys containing at least two of these, further containing at least one element selected from Ag, Au, B, C, Cr, Mo, Mn, P, S, Si, Pb, Pd, Rh, Ru, Sn, V, W, and Zn;
   (iv) any of (i), (ii) or (iii) where said metallic coating also contains particulate additions in the volume fraction between 0 and 95% by volume.

3. An article according to claim 2, wherein the metallic coating contains particulate addition and said particulate addition is of one or more materials which is a metal selected from the group consisting of Ag, Al, Cu, In, Mg, Si, Sn, Pt, Ti, V, W, Zn; a metal oxide selected from the group consisting of $Ag_2O$, $Al_2O_3$, $SiO_2$, $SnO_2$, $TiO_2$, ZnO; a carbide of B, Cr, Bi, Si, W; carbon including carbon nanotubes, diamond, graphite, graphite fibers; ceramic, glass; and polymer material including PTFE, PVC, PE, PP, ABS, epoxy resin.

4. An article according to any one of claims 1 to 3 containing a permanent substrate selected from the group of metals, metal alloys, glass, ceramics, filled polymeric materials and composites, carbon based materials selected from the group of graphite, graphite fibers and carbon nanotubes.

5. An article according to claim 1 wherein said fine-grained metallic layer is deposited by electrodeposition, physical vapor deposition (PVD), chemical vapor deposition (CVD) and cold spraying techniques including kinetic metallization.

6. An article according to claim 1 wherein said fine-grained metallic coating has a hardness between 200 and 2,000 VHN and a yield strength of at least 300 MPa.

7. An article according to claim 1 containing an intermediate conductive layer between said metallic material and said substrate.

8. An article according to claim 7 where the intermediate conductive layer comprises a metallic layer constituted of Ag, Ni or Cu or a combination of any two or all of these, and where the intermediate conductive layer is deposited by electroless deposition, sputtering, thermal spraying, chemical vapor deposition, physical vapor deposition or by any two or more of these.

9. An article according to claim 7 where the intermediate conductive layer comprises polymeric material with conductive particulates therein.

10. An article according to claim 9 where the intermediate conductive layer is a conductive paint or a conductive epoxy.

11. An article according to claim 9 where the conductive particulates are composed of or contain Ag, Ni or Cu or graphite or other conductive carbon or a combination of two or more thereof.

12. An article according to claim 1, wherein said article is a component or part of an automotive, aerospace, sporting equipment, manufacturing or industry application.

13. An article according to claim 12 selected from the group consisting of golf clubs, fishing rods, arrows, hockey sticks, baseball/soft ball bats, tennis racquets, lacrosse sticks, ski poles, walking sticks, skate blades, snowboards, bicycle frames and molds.

14. An article according to claim 1, wherein said article has a tubular structure and said fine-grained metallic material extends over at least part of the inner or outer surface of said tubular structure.

15. An article according to claim 14 selected from the group of golf club shaft, arrow shaft, cartridge casing, baseball/softball bat, fishing rod, ski and hiking poles and bicycle parts.

16. An article according to claim 14 wherein said article comprises a substrate made of a carbon-containing material selected from the group of glass fibers, graphite, graphite fibers, carbon, carbon fibers and carbon nanotubes.

17. An article according to claim 14, having a fine-grained metallic coating with a hardness of greater than 500 VHN and a ratio of wall thickness to grain size of greater than 1,000.

18. An article according to claim 14, wherein said article is wire or cable and said fine-grained metal, metal alloy or metal matrix composite coating represents between 5 and 95% of the total weight of said article.

19. An article according to claim 1 having an fine-grained metallic material coating on a substrate containing graphite/carbon fibers embedded in epoxy, wherein the weight of the fine-grained metallic material is between 5 and 95% of the total weight of the article.

20. An article according to claim 1, wherein said fine-grained metallic material is a Ni, Co or Fe based alloy and the substrate contains graphite/carbon fibers embedded in epoxy.

21. An article according to claim 19 or 20, wherein said article is a golf club shaft, arrow shaft, cartridge casing, baseball/softball bat, fishing rod, ski and hiking poles; a mold, mold component or tooling part; or an automotive or bicycle part.

* * * * *